United States Patent [19]
Schroeder

[11] Patent Number: 5,419,465
[45] Date of Patent: May 30, 1995

[54] AUTOMATIC VOLUME DISPENSING FLUID CONTAINER

[76] Inventor: Jeffrey J. Schroeder, 3613 Darbyshire Dr., Hilliard, Ohio 43026

[21] Appl. No.: 312,123

[22] Filed: Sep. 26, 1994

[51] Int. Cl.$^6$ .............................................. B67D 5/42
[52] U.S. Cl. .................................................. 222/386.5
[58] Field of Search ..................... 222/209, 213–215, 222/386.5, 389, 478

[56] References Cited

U.S. PATENT DOCUMENTS

| | | | |
|---|---|---|---|
| 3,430,731 | 3/1969 | Satzinger | 222/386.5 |
| 4,154,366 | 5/1979 | Acres | 222/386.5 |
| 4,295,582 | 10/1981 | Acres | 222/386.5 |
| 4,350,272 | 9/1982 | Petterson | 222/386.5 |
| 4,556,156 | 12/1985 | Frutin | 222/386.5 |

*Primary Examiner*—Andres Kashnikow
*Assistant Examiner*—Philippe Derakshani
*Attorney, Agent, or Firm*—Thomas S. Baker, Jr.

[57] ABSTRACT

A liquid-dispensing container for repeatedly dispensing a predetermined volume of liquid when repeatedly inverted is provided with a container housing element, and with a collapsible partition element attached in a gas-and liquid-tight manner to the bottom of the housing element to thus form a variable bladder volume which is continuously vented to the atmosphere and which defines the predetermined volume of liquid to be dispensed.

3 Claims, 1 Drawing Sheet

AUTOMATIC VOLUME DISPENSING FLUID CONTAINER

FIELD OF THE INVENTION

This invention relates to containers for dispensing liquids, and more particularly concerns containers which upon repeated inversion dispense a repeated predetermined volume of liquid.

BACKGROUND OF THE INVENTION

There exist many instances, where a liquid in a container is to be dispensed repeatedly in the same pre-measured portion. Such situations include the dispensing of a liquid detergent into a washing machine, the addition of a concentrated liquid chemical to a processing container, etc. Traditionally, there exist two different methods for dispensing exactly-repeated portions of a liquid for such purposes. The first method consists of pouring the liquid into a measurement container in a first step and of emptying the measurement container into the final container in a second step. The chief disadvantages of this method are that an additional tool, the measurement container, must be provided and that the fluid has to be poured twice, thus increasing the chances of spilling the fluid. The second method consists in controlling the outlet of the liquid container by a tap and measuring the dispensed amount of liquid by reading the liquid level on a scale on the liquid container. Since the liquid container has to be held exactly vertically in order to correctly read the level of the liquid and since at least one hand is needed in order to control the tap, this method is mainly restricted to liquid containers installed at a fixed location and is not convenient for small transportable bottles. Additionally, at least a part of the container needs to be transparent in order to observe the level of liquid.

It would be of great advantage to have a liquid container for repeatedly dispensing a fixed volume of liquid in a single step without using an additional measurement container or a tap. Additionally, it would be very convenient if dispensing the defined amount of liquid were easy and no manual control of the apparatus would be necessary to establish the desired volume of liquid. It would be further advantageous if the operation of dispensing a constant volume of liquid could be repeated until the container is empty, without any need of additional operations to be carried out.

SUMMARY OF THE INVENTION

The present invention essentially consists of a container for a liquid, which may be rigid or semi-rigid, and a collapsible, fluid-impervious, formed partition attached at its periphery to the interior periphery of the container bottom. Vent means are also provided in the invention for venting the region within the container located between the formed partition and the container interior bottom to ambient atmospheric pressures. Such is accomplished either by providing the vent opening in the bottom of the container or by providing a vent tube which extends from the outside of the container near the container fill-opening to a location within the region between the formed collapsible partition and the container interior bottom. Thus, the formed, collapsible partition and the container bottom together essentially comprise a vented, variable-volume bladder whose maximum expanded volume is defined by the formed shape of the partition and the formed shape of the container bottom. Since the partition element is formed of a flexible and collapsible material, when the container is in an upright position the weight of the contained liquid above the partition element forces the partition to collapse and lie flat against the interior bottom of the container. When the container is inverted, the out-flowing liquid draws the collapsed partition element away from the container bottom until the formed partition is fully expanded to its maximum shape, because ambient air can flow through the container bottom vent opening or through the vent tube means into the space between the partition element and the inner side of the container bottom. Thus, the amount of fluid which corresponds to the volume difference between the volume of the flexible partition when it is collapsed and the volume of the flexible partition when it is fully expanded is dispensed. Putting back the container in upright position forces the bladder to collapse again and the air inside the bladder to be passed through the vent means, so that the fluid container is reset to its initial state and the dispensing of liquid in the predetermined amount may be repeated merely by reinverting the container.

Thus, the present invention provides a container for dispensing a certain volume of fluid repeatedly in a very easy way.

Several prior patents including U.S. Pat. Nos. 4,955,512 granted to Sharples 4,881,666 issued in the name of Tullman et al., 4,723,688 issued in the name of Munoz, and 4,142,657 granted to Wanke teach liquid containers consisting of a rigid housing and a flexible membrane inside the housing that contains a liquid in order to prevent contact between the contained liquid and ambient air. The goal in each instance is to prevent unwanted oxidation of the contained liquid or to prevent gas (normally carbon dioxide) from escaping from a pressurized liquid such as a carbonated beverage. However, none of the prior art teaches dispensing a predetermined quantity or volume of liquid.

DETAILED DESCRIPTION

Figure 1:
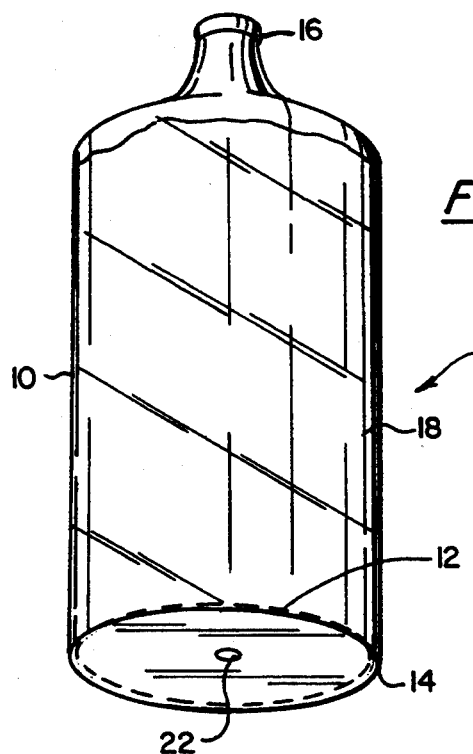
FIG. 1 is a perspective elevational view of a preferred embodiment of the container of this invention positioned in an upright condition.
Figure 2:
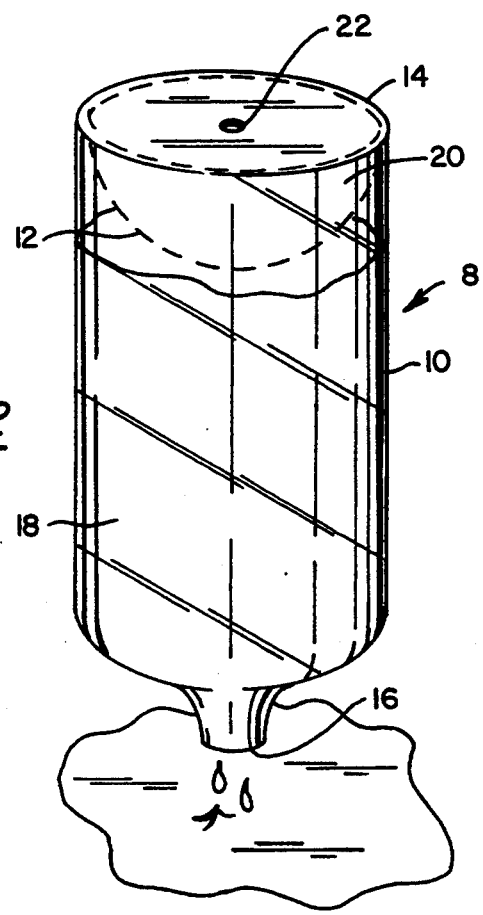
FIG. 2 is a side view of the container of FIG. 1, after it has been inverted and a predetermined volume of liquid has been dispensed.

A preferred embodiment of the present invention is depicted in FIGS. 1 and 2 of the drawings. FIG. 1 illustrates a dispensing container (8) for liquids which essentially consists of a rigid or semi-rigid housing (10) and a collapsed partition element (12) attached in sealed relation around its periphery to the interior periphery of the bottom (14) of container housing (10). The housing has an opening (16) for receiving and discharging the liquid which the container (8) is to dispense in repeatable volumetric amounts. The partition element (12) consists of a flexible film material, which can be readily given a pre-formed shape, which is non-yieldable in planar orientations (linear directions), but which is sufficiently thin to be collapsible under moderate fluid pressures. One example of a satisfactory material is a thin, e.g., 0.001 thickness, "Mylar" film as produced by E. I. DuPont Company at Circleville, Ohio. The material of partition element (12) and also the attachment medium which secures element (18) to the container interior bottom (14) must be impermeable to gasses and to liquids.

Figure 3:
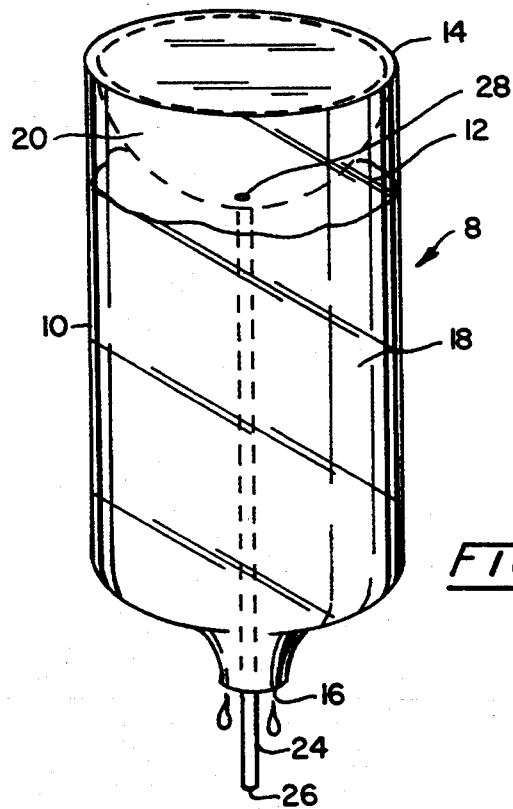
FIG. 3 is a side view of an alternate embodiment of the liquid container of the present invention.

Partition element (12) separates the entire interior volume of the housing (10) into a principal volume (18) between the opening (16) and the upper surface of the partition element (12), and a secondary or bladder volume (20) which lies between the under side of the partition element (12) and the interior bottom (14) of housing (10). The liquid to be dispensed is contained in the principal volume (18). The secondary volume (20) is vented at all times to the ambient environment. It functions as a variable-volume bladder in which the contained air pressure is always at a pressure corresponding to the ambient atmospheric pressure. In the preferred embodiment depicted in FIGS. 1 and 2 an atmospheric vent means which consists of an aperture (22) is located in the bottom (14) of the container housing (10). In another embodiment, depicted in FIG. 3, the vent means consists of a tube (24) with two open ends (26 and 28), where one open end (28) is located in partition element (12) and the other open end (26) is located at outlet opening (16) of the container (8). When utilizing this embodiment of the invention, care must be taken to not pour liquid into open end (26) when filling container (8) with liquid.

When container (8) is positioned in an upright condition, as depicted in FIG. 1, the weight of the fluid causes the partition element (12) to collapse, the air inside the secondary volume (20) is passed through the vent aperture (22) and partition element (12) lies collapsed against the bottom (14) of the container housing (10). Hence, the secondary volume of (20) is for all practical purposes zero. When the container is inverted, as shown in FIG. 2, the out-flowing fluid draws the partition element (12) towards the outlet opening (16) of the housing (10) of the container (8), and ambient atmospheric-pressure air flows through the vent aperture (22) into the bladder principal volume (18) until the partition element (12) is restored to its pre-form shape. This shape partially defines the pre-selected volume of liquid to be dispensed. As soon as the secondary volume (20) is fully expanded, the outflow of the liquid through the out let (16) ceases automatically, because the partition element (12) is fully-expanded and no additional air enters into the secondary volume or bladder volume (20) through aperture (22). The volume of the liquid dispensed through the outlet (16) is equal to the volume difference between the secondary volume (20) when partition element (12) is fully expanded, and the secondary or bladder volume (20) when partition element (12) is collapsed. When the container (8) is brought returned to an upright position, the weight of the fluid presses the partition element (12) against the bottom (14) of the container housing (10), the air in the bladder volume (20) passes through the aperture (22) until the partition element (12) has totally collapsed and the secondary volume is at a minimum so that the container (8) is reset to its initial state and ready for the next measured portion of fluid to be dispensed.

The partition element (12) should consist of a thin, non-yieldable, pliable film material in order to be expanded by the same amount when first inverting a nearly full container, i.e. the fluid to be retained is heavy, and later inverting a nearly empty container, i.e. the fluid to be retained is light. Also, I have found that the dispensing container (8) of this invention works best when opening (16) is limited in size. In the preferred embodiment where the container (8) has a height of approximately eight inches and a diameter of approximately three inches a preferred opening (16) has a diameter of 0.1875 inches. Of course opening (16) may be somewhat smaller or larger than the size stated for the preferred embodiment.

The above descriptions and drawings related to two distinct embodiments of the present invention. It is well understood that these descriptions and drawings are to be interpreted in an illustrative and not in a limiting sense, and it will be apparent to those skilled in the art, that various changes in the devices at the present invention may be made without departing from the scope of the present invention.

I claim my invention as follows:

1. A liquid-dispensing container which upon repeated inversion dispenses a repeated pre-determined volume of liquid, comprising:
   a housing element having a top, a bottom, and an intermediate section which joins said top and bottom;
   an outlet at said housing element top for dispensing liquid from the container or filling liquid into the container;
   a formed, collapsible, fluid-impermeable partition element attached at its periphery in a fluid-tight manner to the periphery of the inside of said housing element bottom to therewith form a variable bladder volume between said partition element and said housing element bottom, the partition element being shaped such that the volume difference between the bladder volume when said partition element is collapsed and the bladder volume when said partition element fully expanded equals the desired volume of the fluid to be dispensed; and
   vent means connecting said bladder volume with the ambient atmosphere, thus providing the air pressure inside said bladder volume to be always equal to the atmospheric pressure.

2. The container defined by claim 1, wherein said vent means establishing a pressure correspondence between said bladder volume and the ambient atmosphere consists of an aperture in said housing element bottom.

3. The container defined by claim 1, wherein said vent opening means establishing a pressure correspondence between said bladder volume and the ambient atmosphere consists of a tube length having two open ends, one said tube open end communicating with said bladder volume and the other said tube length open end is located at said opening for receiving and dispensing liquids.

* * * * *